T. G. HANEY.
DRIER.
APPLICATION FILED JUNE 18, 1917.
1,255,162.
Patented Feb. 5, 1918.
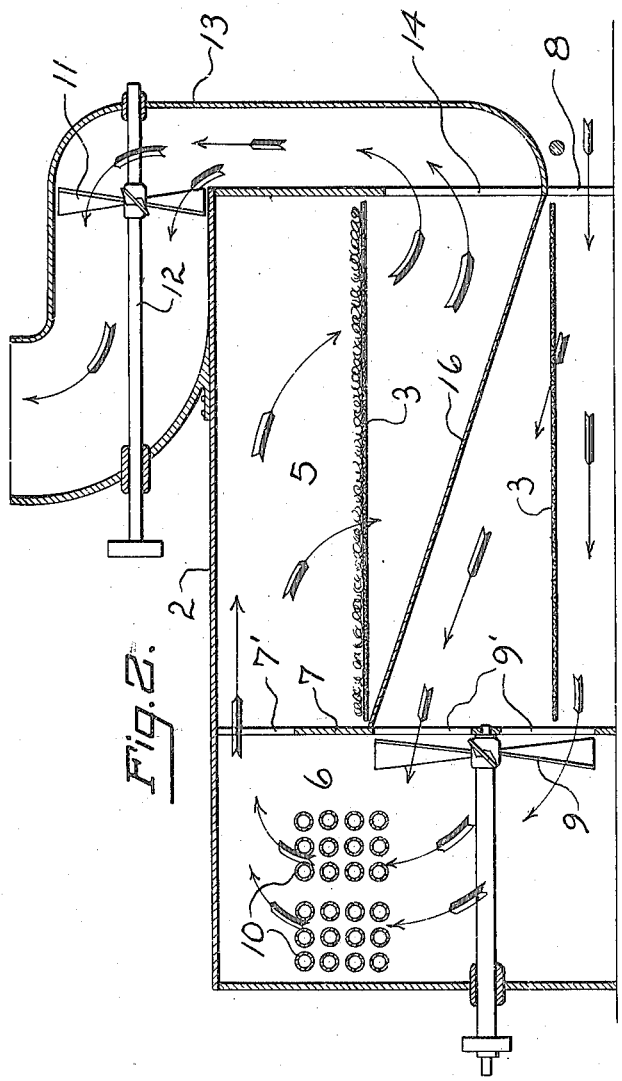
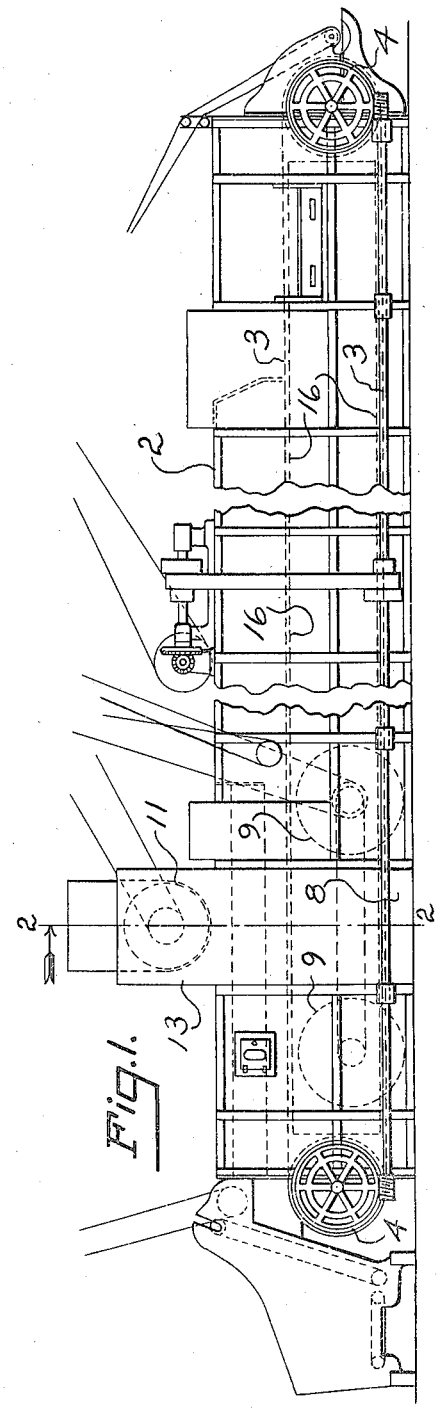
Inventor
Thomas G. Haney
By _____
Attorney

UNITED STATES PATENT OFFICE.

THOMAS G. HANEY, OF NEW LONDON, CONNECTICUT.

DRIER.

1,255,162.   Specification of Letters Patent.   Patented Feb. 5, 1918.

Application filed June 18, 1917. Serial No. 175,254.

*To all whom it may concern:*

Be it known that I, THOMAS G. HANEY, a citizen of the United States, residing at New London, in the county of New London and State of Connecticut, have invented certain new and useful Improvements in Driers, of which the following is a specification.

This invention relates to driers. There is a form of drier involving a casing and air supply and exhaust fans for effecting the circulation of air through the drier and also through a conveyer therein, the casing containing a heater such as steam pipes, to heat the air. My invention while capable of general use is, however, especially directed to the type of drier identified. The primary purpose I have in view is the provision of simple means by which the efficiency of the drier can be increased. This I accomplish by positively preventing the admixture of the air in a moist or wet condition after it has passed the material on the conveyer with the air entering the apparatus but which has not yet encountered the heater. The two bodies of air are thus separated, and as a consequence the air which has been used for drying the material and which is wet or moist cannot possibly come into association with the entering or comparatively speaking fresh air.

In the drawings accompanying and forming part of the present specification I have shown in detail one convenient form of embodiment of the invention which to enable those skilled in the art to practise the same will be set forth fully in the following description. I do not necessarily restrict myself to this particular disclosure; I may depart therefrom in several respects within the scope of the invention defined by the claims following said description.

Referring to said drawings:

Figure 1 is a side elevation of a drier involving the invention.

Fig. 2 is a transverse section on the line 2—2 of Fig. 1, looking in the direction of the arrow and on a larger scale.

Like characters refer to like parts throughout both views.

The drier as may be inferred can be used in conjunction with various materials, raw cotton and wool being merely two illustrations of several. The drier as shown comprises an elongated casing or housing as 2. This casing incloses as illustrated, an endless conveyer, apron or belt 3 of foraminous or open-work construction. The conveyer is carried upon the drums 4 located near the ends of the casing 2. This casing is longitudinally divided into the chambers 5 and 6 by the wall or partition 7, the chamber 5 being wider than the chamber 6 and containing the endless conveyer or belt 3 to which I have already referred. One of the side walls or that on the right in Fig. 2 has one or more openings as 8 near the floor or foundation upon which the casing 2 rests, to receive atmospheric air. The air is drawn through said inlet or opening 8 by an intake or inlet fan as 9 opposite the opening 9' in said wall 7, the shaft of the fan being supported by the partition or wall 7 and by the adjacent wall of the casing 2. Said shaft and consequently the fan 9 may be driven in any convenient manner. In the chamber 6 is a suitable heater such as the steam pipes 10. The inlet 8 as shown is practically under the lower run of the conveyer or belt 3. Atmospheric air, therefore, is drawn under the conveyer, through the opening or inlet 8 by the fan 9 and is directed through the chamber 6 where it is heated by the heater 10, passing through the opening 7' in the wall 7 to the upper surface of the upper run of the conveyer or belt 3. Said conveyer or belt 3 being of open-work construction, it is, of course, clear that the air at this time heated is directed through the mass of material on the belt. An exhaust or outtake fan 11 is provided for drawing the air from the casing 2 after it has served its purpose of drying the material on the conveyer. This fan 11 may be operated in any desirable manner, its shaft 12 being supported by opposite walls of the casing 13, the fan casing having its inlet in register with the opening 14 in the conveyer casing 2. This opening 14 it will be observed is situated between the upper and lower runs of the conveyer or belt 3.

From the back edge of the upper run or side of the conveyer or belt 3 to the front side or edge of the lower run thereof extends the wall or partition 16, said wall being imperforate and ordinarily consisting of sheet metal. It will be clear that after the heated air leaves the chamber or compartment 6, it passes by way of the opening 7' into the chamber or compartment 5 and is drawn through the upper run of the conveyer and the mass of material thereon by the exhaust fan 11. The wall or partition 16 prevents as will be clear in a positive manner the air after it has passed through the upper run of the conveyer, and this air at this time is wet or at least moist, from commingling with the fresh air entering the casing, the result being that the drying of the substance of whatever character it may be on the conveyer is materially hastened. As a matter of fact I have found that I can in a given time heat a larger quantity of material than is possible with existing apparatus. The arrows in Fig. 2 show the course of the air from the time it enters the casing 2 until it is discharged from the casing 3 by the action of the fan 11. The partition or wall presents a barrier to the mixing of the wet air with the fresh or outside air.

What I claim is:

1. A drier comprising a casing having an inlet for atmospheric air, an endless reticulated conveyer in the casing, a heater in the casing, means for forcing the atmospheric air in contact with the heater and then heated through the upper run of the conveyer, and means for positively and at all times preventing the air after it has passed through said upper run from coming in contact with the air entering the casing.

2. A drier comprising a casing having an inlet for atmospheric air, an endless reticulated conveyer in the casing, a steam heater in the casing, means for forcing the atmospheric air in contact with the steam heater and through the upper run of the conveyer, and means for positively and at all times preventing the air after it has passed through said upper run from coming in contact with air entering the casing.

3. A drier comprising a casing having a partition, extending longitudinally thereof to divide the same into two compartments, a conveyer in one of the compartments, a heater in the other compartment, the casing having an inlet for air at one side of the conveyer, the partition having an opening between the runs of the conveyer and also having an opening above the upper run of the conveyer, a fan opposite said first opening, the wall of the casing in which the inlet is situated having an outlet, a fan and its casing, the latter being in communication with said outlet, and imperforate means inside of the conveyer, extending between the upper sides of said first mentioned opening and said inlet.

4. A drier comprising a casing having a partition, extending longitudinally thereof to divide the same into two compartments, a conveyer in one of the compartments, a heater in the other compartment, the casing having an inlet for air at one side of the conveyer, the partition having an opening between the runs of the conveyer and also having an opening above the upper run of the conveyer, a fan opposite said first opening, the wall of the casing in which the inlet is situated having an outlet, a fan and its casing, the latter being in communication with said outlet, and an imperforate partition extending angularly between the upper side of said first opening and said inlet between the runs of the conveyer.

5. A drier comprising a casing having a partition extending longitudinally thereof to divide the same into two compartments, a conveyer in one of the compartments, a heating coil in the other compartment, the casing having an inlet for air at one side of the conveyer, the partition having an opening between the runs of the conveyer and also having an opening above the upper run of the conveyer, a fan opposite said first opening, the wall of the casing in which the inlet is situated having an outlet, a fan and its casing, the latter being in communication with said outlet, and an imperforate partition inside the conveyer, extending angularly between the upper side of said first mentioned opening and said inlet, between the runs of the conveyer.

6. A drier comprising a casing having an inlet for atmospheric air, and endless reticulated conveyer in the casing, a heater in the casing, means for drawing atmospheric air into the casing, passing the same in contact with the heater and thence heated through the upper run of the conveyer, and an imperforate plate extending from the side edge of the upper run to the side edge of the lower run of the conveyer, to positively prevent the air after it has passed through said upper run from coming in contact with the air entering the casing.

7. A drier comprising a casing, an endless reticulated conveyer in the casing, means for drawing air into the casing and forcing the same through the material carrying run of the conveyer, means for heating the air before it passes through said material carrying run, and means for positively and at all times preventing the air after it has passed through the material carrying run of the conveyer, from mixing with the incoming air.

In testimony whereof I affix my signature in the presence of two witnesses.

THOMAS G. HANEY.

Witnesses:
LOUIS W. MEYER,
JASPER P. HASKELL.